H. PETERSON.
WAGON.
APPLICATION FILED SEPT. 30, 1908.
952,943.
Patented Mar. 22, 1910.
4 SHEETS—SHEET 3
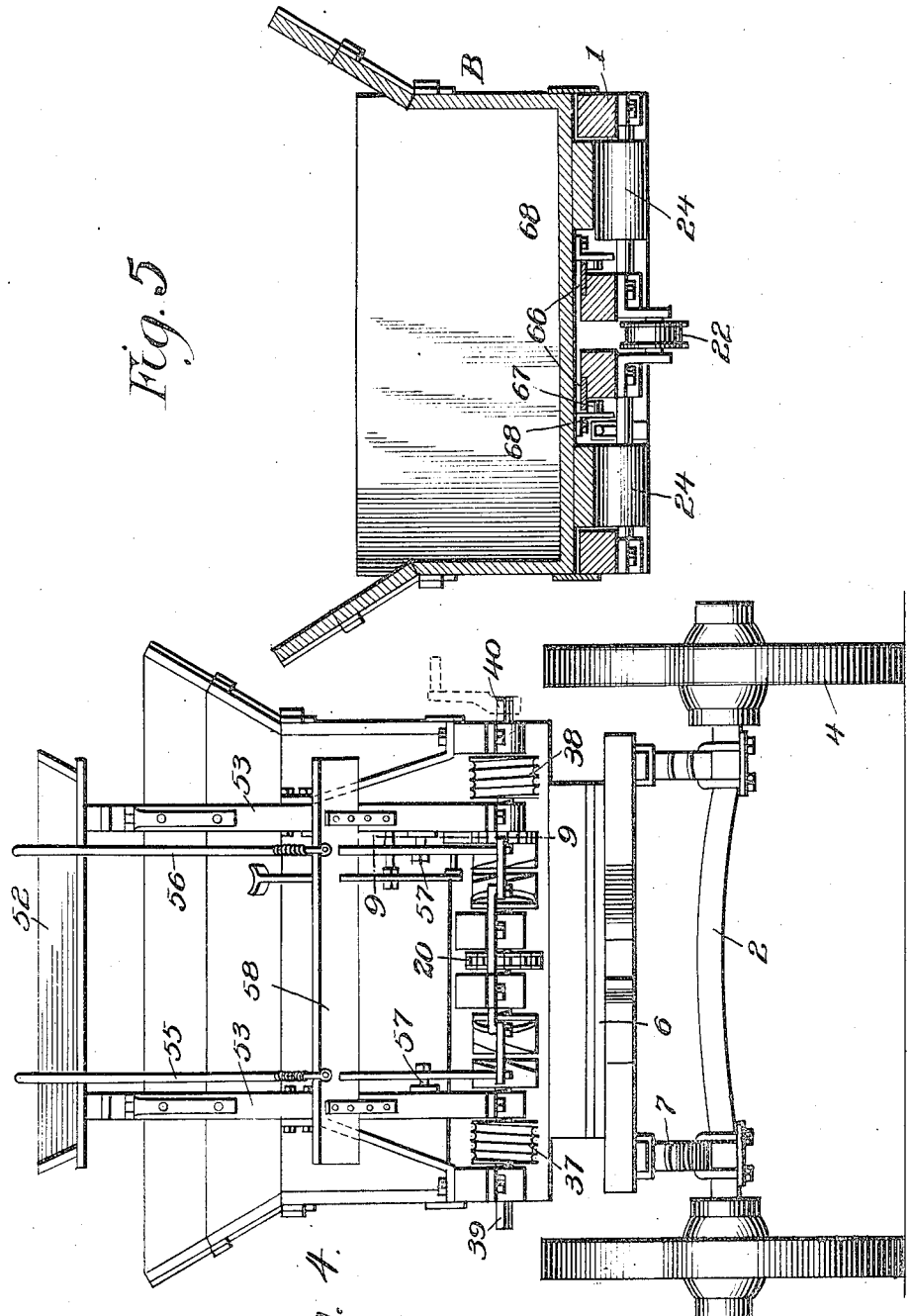
Witnesses
Inventor
Harry Peterson
By Victor J. Evans
Attorney

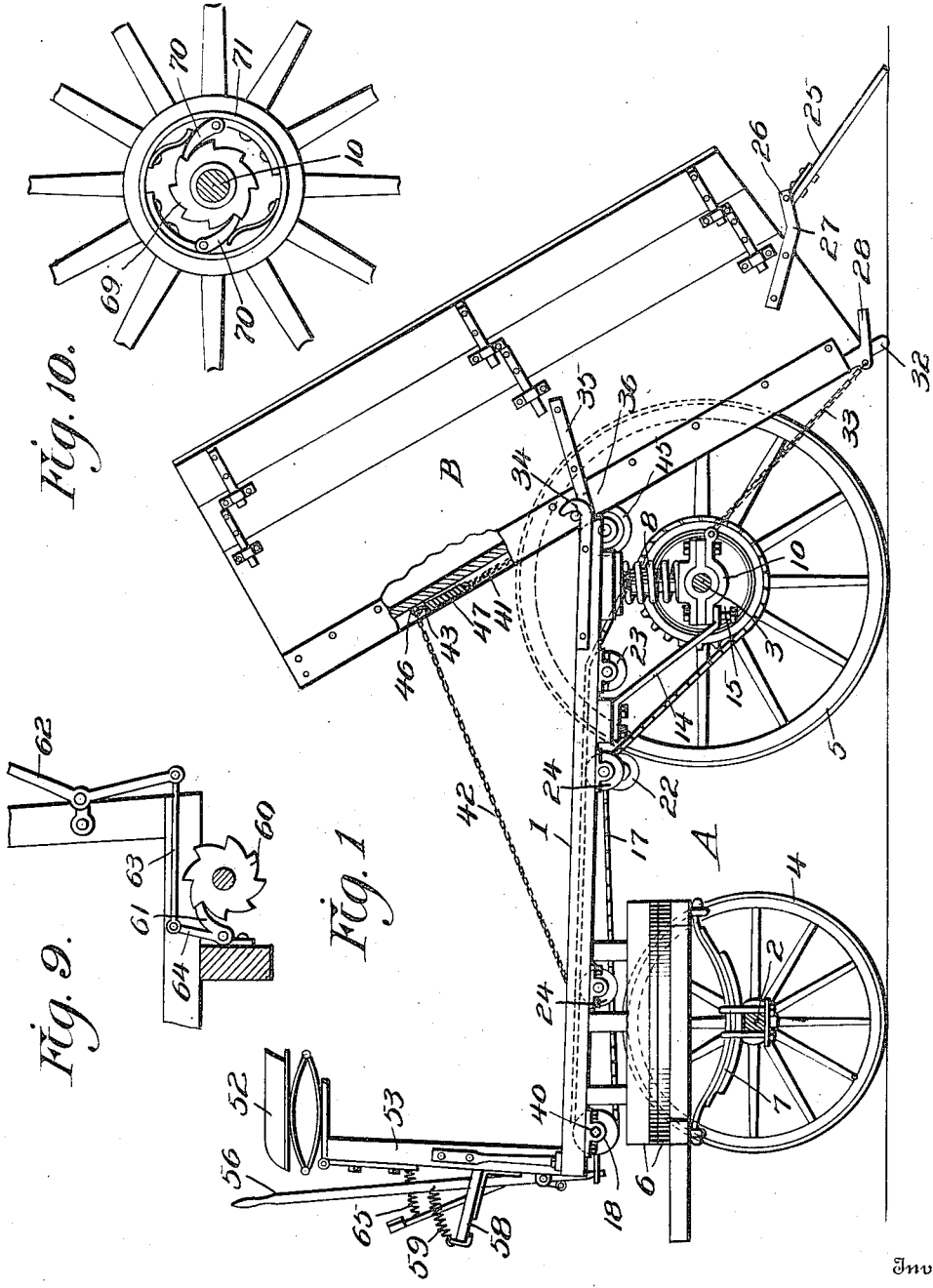

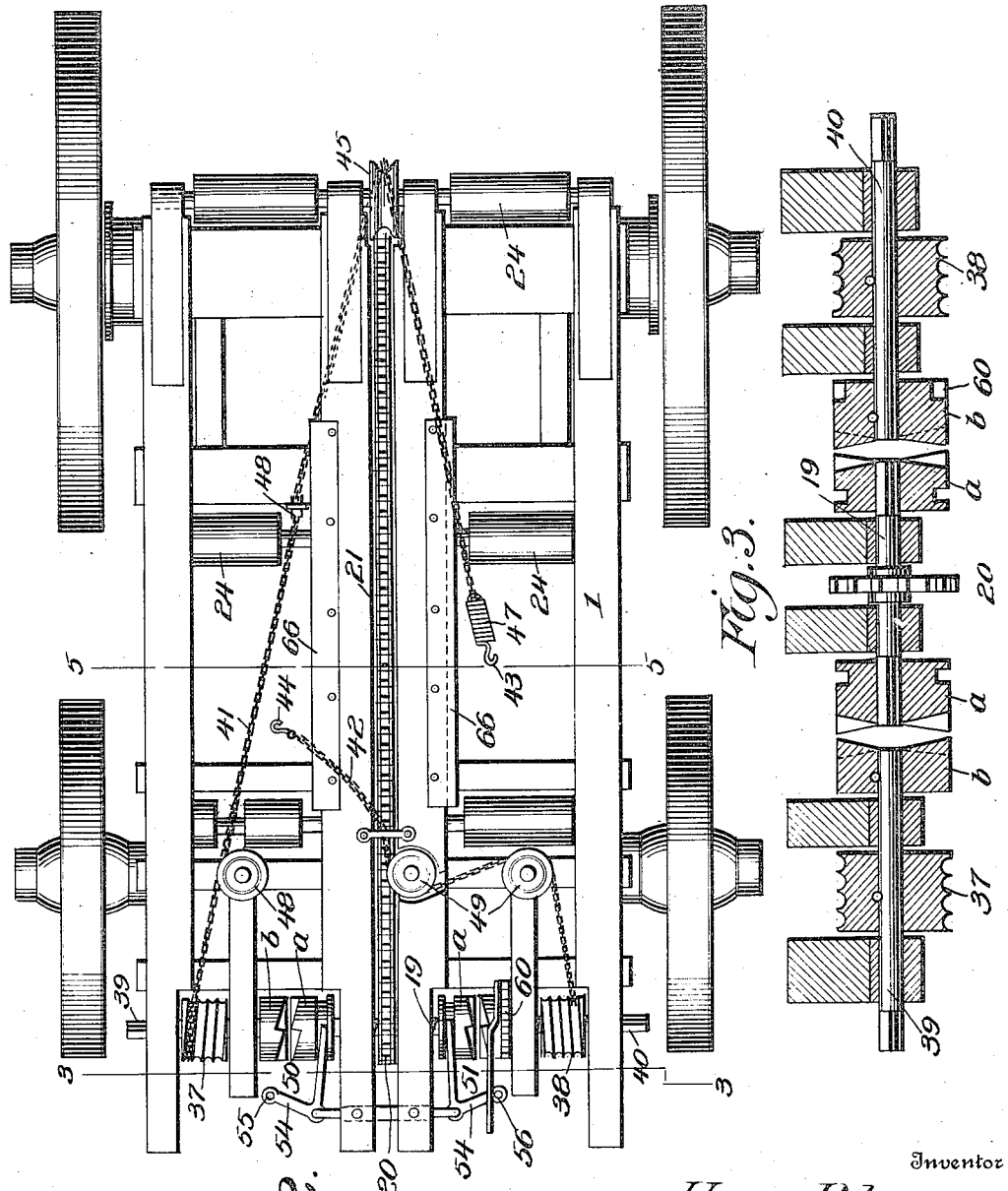

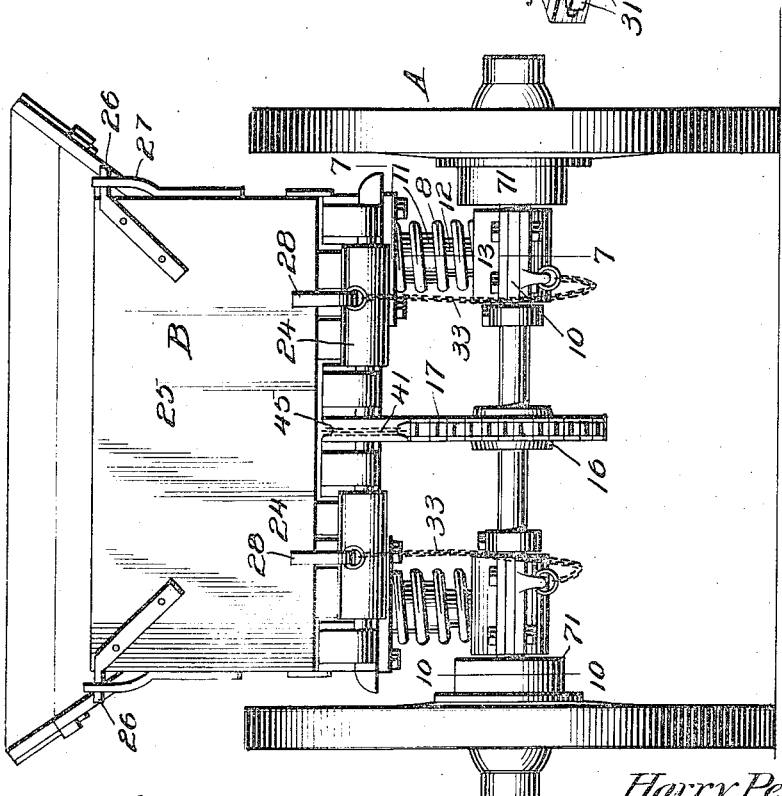

UNITED STATES PATENT OFFICE.

HARRY PETERSON, OF BROOKLYN, NEW YORK.

WAGON.

952,943.
Specification of Letters Patent.
Patented Mar. 22, 1910.

Application filed September 30, 1908. Serial No. 455,547.

*To all whom it may concern:*

Be it known that I, HARRY PETERSON, a subject of the King of Sweden, residing at Flatbush, Brooklyn, in the county of Kings and State of New York, have invented new and useful Improvements in Wagons, of which the following is a specification.

This invention relates to vehicles and more particularly to dumping wagons of that type wherein the body can be dumped and returned to normal position by power derived from the wheels through suitable mechanism controlled by the driver, so that the wagon is not required to be stopped for the dumping operation.

The invention has for one of its objects to improve and simplify the construction and operation of wagons of this character so as to be comparatively simple and inexpensive to manufacture, reliable and efficient in use, and readily controlled.

Another object of the invention is the provision of a dumping wagon in which the body is adapted to be drawn backwardly by a chain and pulley device thrown into operation by a clutch until the body reaches its rearmost position where it tilts automatically for dumping the contents and which is adapted to be restored to normal position by another chain and pulley device thrown into operation by a second clutch, the winding of the chains being effected either automatically by power derived from the wheels, or manually, as by means of a hand crank.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of a wagon showing the body in dumping position and with a portion of the body broken away. Fig. 2 is a plan view of the wagon with the body removed. Fig. 3 is a vertical transverse section on line 3—3, Fig. 2. Fig. 4 is a front view of the wagon. Fig. 5 is a transverse section taken on line 5—5, Fig. 2, with the body in place. Fig. 6 is a rear view of the wagon. Fig. 7 is a detail sectional view on line 7—7, Fig. 6. Fig. 8 is a perspective view of one of the tail-board catches or locks. Fig. 9 is a detail section on line 9—9, Fig. 4, showing the locking device for holding the wagon body in normal position. Fig. 10 is a detail sectional view on line 10—10, Fig. 6, showing the compensating gear for the rear driving wheels of the wagon.

Similar reference characters are employed to designate corresponding parts throughout the views.

Referring to the drawing, A designates the running gear of the wagon and consists of a bed or frame 1 supported on front and rear axles 2 and 3 which are equipped, respectively, with traction wheels 4 and 5. Between the wagon frame 1 and front axle is a fifth wheel device 6 for permitting the wagon to be turned in a short radius and secured to the axle are semi-elliptical or other springs 7 for cushioning the front of the wagon. The rear part of the frame 1 is supported on helical compression springs 8 interposed between plates 9 secured to the under side of the frame and bearings 10 for the axle 3, the plates 9 being provided with sleeves 11 in which reciprocate plungers 12 on the cap plates 13 of the bearings 10 which prevent relative displacement of the frame 1 and rear axle toward the front or rear under the strain of service and at the same time permit the wagon frame to rise and fall with the expansion and contraction of the springs 8 in passing over obstructions or depressions in the roadway. The rear axle is also steadied by braces 14, Fig. 1, rigidly secured at their upper ends to the under side of the wagon frame 1 and connected by bolts 15 to the rear axle bearings 10 to freely slide up and down on the bolts as the wagon frame rises and falls. The rear axle 3 is fastened in any suitable manner to the wheels 5 so as to be rotated by the latter as the wagon travels, and on the center of the axle is a sprocket wheel 16 around which extends a sprocket chain 17. At the front of the frame 1 and mounted in bearings 18 is a horizontal transverse shaft 19 which is provided with a sprocket wheel 20 over which the sprocket chain 17 passes to rotate the said shaft, the upper stretch of the chain extending horizontally through a passage 21 disposed longitudinally in the center of the frame 1. The lower stretch of the chain passes over an idler 22 suitably supported on the frame so as to hold the chain above the front carriage of the running gear so that such carriage can swing around freely during the turning of the wagon, and the upper stretch of the chain passes over an idler 23. The frame or bed 1 of the wagon is provided with a number of rollers 24 on which the body B of the wagon is adapted to move to and from dumping position, the movement of the body being effected by flexible elements and winding devices on the shaft 19, as will be hereinafter more fully explained.

The body B may be of any approved construction and is closed around all sides except the back where it is provided with a tail-board 25 fulcrumed at its top on pintles 26 carried on the upper end of brackets 27 that are secured to the sides of the wagon body. Under the body and adjacent the rear thereof are locks or catches 28 that are adapted to engage behind the tail-board adjacent the bottom edge thereof so as to hold the tail-board in closed position against the lateral pressure of the material in the wagon body. These catches are formed on the rear extremities of bars 29 that are hingedly connected at 30 to plates 31, Fig. 8, that are secured to the wagon body under the floor thereof. The locking bars 29 rest on the rear rollers 24 on the frame 1 when the body B is in normal position, and as the body is moved rearwardly during the dumping operation, the locking bars or latches drop down by gravity as soon as they ride off the rear rollers 24 so that the tail-board can swing open under the weight of the material in the body as the latter is tilted.

In order to prevent the extremities 28 of the latches or locking bars from being bent or broken by trailing over the ground during the dumping operation, bars 32 are secured to the wagon body with their rear ends projecting beyond the catch extremities 28 so as to run on the ground, as shown in Fig. 1, when the body is tilted. The plates 31 are provided with slots 31ª through which extend bolts 31ᵇ which fasten the catches to the bars 32. The slots allow the catches to be adjusted backwardly or forwardly so as to cause the extremities to properly engage the tail gate and hold the same in closed position.

To insure the dropping of the latches, it may be desirable to connect each with a chain 33 which is, in turn, connected with a suitable part of the running gear, as for instance the axle bearings 10 so that the chains will pull the catches downwardly to unlocking position at some point in the rearward or dumping movement of the wagon body. On the sides of the body and adjacent the middle thereof are outwardly-extending pivots or trunnions 34 formed on the lower end of straps 35 that are riveted or otherwise secured to the side boards of the body, and these trunnions are adapted to engage hook-shaped abutments 36 secured to the running gear frame 1 at the rear corners thereof so as to arrest the rearward horizontal movement of the wagon body and form bearings on which the latter tilts to dump the load. The latch chains 33 also assist in the tilting of the body since they exert a downward pull on the rear end of the body as the latter is projected backwardly.

The mechanism for dumping and restoring the wagon body consists of separate drums 37 and 38 mounted on shafts 39 and 40 disposed in axial alinement with the front shaft 19 that is driven by the sprocket chain 17 from the rear axle, and attached to these drums are chains or other flexible elements 41 and 42 that are secured by terminal hooks 43 and 44 to suitable parts of the wagon body, so that when the first chain is wound, the wagon body will be moved to dumping position, and when the second chain is wound, the body will be restored to normal position. The dumping chain 41 passes rearwardly to and over a guide pulley 45 at the rear of the wagon frame or bed 1 and then extends forwardly under the center of the body B and is connected therewith by the hook 43 engaging in a staple, ring or other fastening 46 on the bottom of the body, as shown in Fig. 1, there being a stiff extension spring 47 attached to the chain 41 so that the starting of the body may be effected gradually and without undue shock when the winding drum 37 is thrown into operation. The chain 41 passes over guiding devices such as pulleys 48 on the wagon frame and the chain 42 passes over pulleys 49, the hook 44 of such chain being connected with the same fastening 46 to which the other chain is attached. By this arrangement, one chain unwinds while the other chain winds.

Between the adjacent ends of the alining shafts or axles 19, 39 and 40, are clutches 50 and 51 which are operated from the driver's seat 52 supported on uprights 53 at the front of the frame 1, and each clutch includes a sliding member $a$ on the shaft 19 with which it rotates and which is adapted to be thrown into and out of engagement with the clutch element $b$ on the adjacent drum shaft. The sliding elements of the clutches are actuated by bell crank levers 54 fulcrumed on the front of the frame 1 and connected with the lower ends of shifting levers 55 and 56 mounted on pivots 57 on the seat standards 53, Fig. 4, the levers extending upwardly through the foot-board 58 for the driver so that the upper ends of the levers can be within convenient reach. The clutches are held open by springs 59 connected with the levers and foot-board and arranged to exert a pull on each lever in a direction to normally hold the sliding clutch elements $a$ out of engagement with the clutch elements $b$.

When the body B is in normal position, the front thereof bears against the seat standards 53 and the chain 42 is held taut so that the running gear cannot be pulled out from under the body, and the chain 42 is prevented from unwinding by means of a ratchet wheel 60 on the shaft 40 and with which coöperates a pawl 61, Fig. 9, that is released by a pedal-lever 62 arranged adjacent the foot of the driver and connected by a link 63 with the arm 64 of the pawl, the pawl being held in locking position by a spring 65, Fig. 1, connected with the pedal-lever to exert a pull thereon in a direction to hold the pawl in engagement with the ratchet wheel. By the employment of this pawl and ratchet device for locking the wagon body in normal position, it is necessary to first release the pawl by pressing the pedal-lever before the clutch-shifting lever 55 is actuated to connect in the winding drum 37 for effecting the dumping of the body. As soon as the wagon is dumped, the hand and pedal-levers 55 and 62 are released and the hand-lever 56 actuated to close the clutch 51 for causing the restoring drum 38 to wind the chain 52 to thereby return the body to normal position, and during this winding of the drum 38, the ratchet wheel 60 rides freely under the pawl 61. Since the shaft 19 carrying the driving elements a of the clutches rotates continuously during the travel of the vehicle, it is obvious that the dumping and restoring of the wagon body can be accomplished without stopping the vehicle. By having the drum shafts separate from the shaft 19, the dumping and restoring of the body B can be accomplished by hand, it being merely necessary to apply a crank to the outer end of either shaft 39 or 40 which is squared for that purpose, as shown in Figs. 2 and 3.

It is essential that the loaded body B should move rearwardly in a horizontal plane until the trunnions 34 strike the abutments 36, and for this purpose, the frame or bed 1 of the running gear is provided with parallel guides or rails 66, as shown in Figs. 2 and 5, and under these rails engage rollers 67 supported on brackets 68 secured to the under side of the bottom of the body. By this arrangement, the body is held on the rollers 24 during the backward movement of the body until the rail-engaging rollers or devices 68 pass beyond the rear ends of the rails 66, which are so located that the body can tilt without interference when the trunnions 34 reach the abutments 36 at the end of the rearward movement of the body.

It is observed that the guides 66 are of a less length than the range of movement of the body and are so disposed upon the running gear that when the body reaches the limit of its rearward movement the rollers 67 clear said guides, thereby admitting of the body tilting and when the body is at a limit of its forward movement the said rollers 67 also clear the guides, thereby admitting of the rollers 67 occupying a position to engage under the guides 66 during the rearward movement of the body to prevent tilting thereof until the trunnions 34 engage the abutments 36 in the manner stated.

As the rear wheels are employed to drive the axle 3, compensating devices are employed at each wheel and such devices each comprises, as shown in Fig. 10, a ratchet wheel 69 on the axle and a plurality of spring-pressed pawls 70 pivotally mounted within the casing 71 that is secured to the hub of the adjacent wheel. By this arrangement, the wheels can turn at different speeds, as the wagon is driven around a corner or turned.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the embodiment thereof, I desire to have it understood that the apparatus shown is merely illustrative, and that such changes may be made when desired as are within the scope of the claims appended hereto.

Having thus described the invention, what I claim is:—

1. A dumping wagon comprising a running gear, a continuously driven shaft mounted thereon, drum shafts arranged in coöperative relation therewith, means for connecting either drum shaft with the first-mentioned shaft, a body slidably and tiltably mounted on the running gear, flexible elements connected with the body and drum shafts for moving the body into and out of dumping position, a locking device for one of the drum shafts arranged to hold the body in normal position, a rail extending longitudinally on the running gear and of less length than the movement of the body, and a device on the body slidably engaging under the rail during the movement of the body from normal to tilting position.

2. A dumping wagon comprising a wheel-supported frame, a continuously driven shaft mounted thereon, winding shafts arranged in alinement with the first-mentioned shaft, normally open clutches between the continuously-driven and winding shafts, a flexible element connected with one of the winding shafts, a body mounted on the frame and connected with the element to be moved to dumping position thereby, an element connected with the other winding shaft and body for restoring the latter, a ratchet wheel on such restoring shaft, a pawl arranged to engage the wheel to hold the body in normal position by preventing unwinding of the restoring element.

3. A dumping wagon comprising a frame, axles, springs supporting the frame on the axle, wheels on the axles, compensating devices between one axle and the wheels therefor, a shaft mounted on the frame, sprocket chain between the shaft and the driven axle for rotating the shaft and permitting the body to rise and fall with respect to the axle, a movable body on the frame, and separately controlled devices operatively connecting the body with the shaft for moving the body into and out of dumping position.

4. A dumping wagon comprising front and rear wheels, a fixed front axle, a rotatable rear axle, a frame carried by the axles, a shaft mounted on the frame, a sprocket wheel and chain mechanism between the axle and shaft for continuously driving the latter, a body slidably mounted on the frame, means between the frame and body for limiting the rearward movement of the latter, means operatively connected with the shaft for moving the body rearwardly and tilting the same, an additional means operatively connected with the shaft for returning the body to normal position, and a foot-actuated pawl and toothed wheel device coöperating with the last-mentioned means for locking the body in normal position.

5. A dumping wagon comprising a running gear, a tiltable body mounted thereon, a swinging tail-gate for the body, a pivoted locking member arranged under the body to hold the tail-gate in locked position and adapted to drop by gravity for releasing the tail-gate during the tilting of the body, a bar fixed on the body and projecting beyond the locking member to bear on the ground when the body is in dumping position, and means for adjusting the locking member with respect to the tail gate.

6. A dumping wagon comprising a running gear, a slidable and tiltable body thereon, parallel guides on the running gear, members on the body arranged to engage under the guides for preventing tilting of the body until the end of the sliding movement of the latter is reached, said guides being of less length than the range of movement of the body, whereby the said members disengage from the guides when the body reaches the end of its rearward movement and the members ride on the top of the guides during the forward movement and drop off the forward ends thereof when the body reaches its normal position, and separate devices for moving the body to and from dumping position by the movement of the wagon.

In testimony whereof I affix my signature in presence of two witnesses.

HARRY PETERSON.

Witnesses:
JOHN L. JENSEN,
JOHN SANDBERG.